United States Patent
Keller

[11] 3,854,031
[45] Dec. 10, 1974

[54] WELDING APPARATUS
[75] Inventor: Josef Keller, Lengerich, Germany
[73] Assignee: Windmoller & Holscher, Lengerich, Westphalia, Germany
[22] Filed: May 23, 1973
[21] Appl. No.: 362,907

[30] Foreign Application Priority Data
May 27, 1972  Germany............................ 2225931

[52] U.S. Cl.............................. 219/244, 93/DIG. 1
[51] Int. Cl. .............................................. H05b 1/00
[58] Field of Search...... 219/244; 93/DIG. 1; 53/39; 156/515, 582

[56] References Cited
UNITED STATES PATENTS
| | | | |
|---|---|---|---|
| 2,163,278 | 6/1939 | Hayes.......................... | 93/DIG. 1 X |
| 2,483,155 | 9/1949 | Salfisberg.................... | 93/DIG. 1 X |
| 2,691,613 | 10/1954 | Baer........................... | 53/39 |
| 2,697,314 | 12/1954 | Stirn et al. ................. | 93/DIG. 1 X |
| 2,737,859 | 3/1956 | Allison et al................ | 93/DIG. 1 X |
| 3,054,441 | 9/1962 | Gex et al. ................... | 156/515 |

*Primary Examiner*—C. L. Albritton
*Attorney, Agent, or Firm*—Fleit & Jacobson

[57] ABSTRACT

A plurality of superposed heat-fusable films are slung about a rotary welding cylinder equipped with a plurality of welding bars effective to produce transverse weld seams at intervals along the length of the films in a continuous operation. A backing cylinder co-operating with the welding cylinder and turning at the same peripheral speed as the welding cylinder is equipped with a plurality of pressure bars effective to exert pressure on the superposed films at the desired locations of the weld seams when the welding bars underlie the pressure bars.

8 Claims, 2 Drawing Figures

WELDING APPARATUS

The invention relates to an apparatus for fusing several superposed continuously fed plastics films or the like to one another by means of transverse weld seams produced by welding bars disposed on a rotary welding cylinder about which the films are partially slung.

The invention aims to provide an improved such apparatus, in which the transverse seams or heat seals are not continuously under pressure whilst the films remain slung about the cylinder, in which air included between the films is effectively squeezed out from the regions where the seams are to be formed, and in which the pressure applied to the seams is adjustable.

The invention is also based on the following considerations. For optimum heat fusion or welding, the time during which the films are slung about the rotary welding cylinder should be apportioned so that there is a sufficient pre-heating time for the films, the actual welding period, and a cooling period, this being effected by the appropriate disposition about the cylinder periphery of control elements for heaters of the welding bars. The pre-heating period is the time commencing when a particular film portion first makes contact with the welding cylinder and terminating when the films first start to adhere to one another. During the welding period, the confronting film surfaces are homogeneously melted by further heating and by distribution of the heat and subsequent compression of the webs. The cooling period is constituted by the remainder of the time during which the films are slung about the welding cylinder and serves to solidify the fresh weld seam on the cylinder periphery to permit further processing of the interconnected films.

The production speed of a welding cylinder of given size and a given length of film slung about the cylinder can be increased only if a reduction of the total time for which the films are slung about the cylinder still permits proper welding to be achieved. A reduction in the pre-heating period by increasing the operating temperature of a heating strip that is usually provided on the operative surface of each welding bar is practically impossible because of the danger of over-heating of the film portions that are in direct contact with the heating strip. The same applies to a reduction in the actual welding period. Whereas in the pre-heating period the amount of heat introduced to the film material is of primary importance, during the welding period it is more important that the heat becomes uniformly distributed in the region that is actually to be welded whilst further heat is introduced. The heat distribution can be effected considerably more rapidly by bringing the films into intimate contact by the application of pressure from the outside. However, if the element applying the pressure rotates together with the welding cylinder whilst the films are in contact with the latter, it will absorb a marked amount of heat from the weld seam, the result being that it takes longer to bring the films to the required welding heat so that the pre-heating period or the actual welding period must be increased.

Accordingly, it is another aim of the invention to provide an apparatus in which a backing member for the welding cylinder is effective to produce transverse weld seams more rapidly without sacrificing the quality of the seams, especially as far as airtightness is concerned.

According to the invention, apparatus for fusing a plurality of superposed continuously fed plastics films or the like to one another by means of transverse weld seams comprises a rotary welding cylinder about which the films are partially slung, a plurality of welding bars carried by the welding cylinder at its periphery, a rotary backing cylinder for exerting pressure on the superposed films, a plurality of pressure bars provided on the backing cylinder at a pitch corresponding to that of the welding bars, and means for rotating the backing cylinder at the same peripheral speed as the welding cylinder, the rotary shaft of the backing cylinder being adjustable in position along an arc concentric with the welding cylinder.

By constructing the externally applied pressure element in the form of a backing cylinder carrying pressure bars, the application of pressure to the films is restricted to the very short period during which the backing cylinder and welding cylinder are in contact with the films disposed therebetween. Prolonged contact by each pressure bar during the pre-heating period and the loss of heat through the pressure bar during this time are therefore avoided. The adjustability of the backing cylinder relatively to the welding cylinder periphery permits adjustment of the pre-heating period represented by the arc between where the films run onto the welding cylinder and where the nip between the welding and backing cylinders is formed. During the preheating period the films, which are relatively loosely superposed under the action of the tension in the films, are heated until they reach a plastic condition. They are then suddenly compressed by one of the pressure bars on the backing cylinder and, after a further supply of heat serving to homogenize the previously compressed area of the sea, the seam can cool off before it leaves the welding cylinder. The time for which the films are compressed is considerably reduced by making the backing element in the form of a backing cylinder equipped with pressure bars but the actual pressure that is applied can be markedly higher than hitherto.

The work involved in applying the pressure, being the product of the force and the time during which this force is applied, may be much the same as for hitherto known welding apparatus but time is saved during preheating and cooling of the films. Since the properties of the films to be welded (film thickness, thermal conductivity, melting point etc.) make it necessary and important to permit fine adjustment of the instant of pressure application, the use of a backing cylinder with pressure bars and its adjustability to a particular location at the periphery of the welding cylinder are deemed to be interrelated. The two cylinders do not continually roll on one another; instead, pressure is applied intermittently only in the regions where transverse weld seams are to be produced. Consequently, air pockets are not rolled into the weld seams. Any air inclusions are effectively squeezed out of the region of the seams.

To permit the welding bars and the pitch of the pressure bars to be adapted to various spacings between the weld seams to be produced in the films, the backing cylinder is preferably provided with T slots for receiving replaceable clamping means for the pressure bars. Alternatively, the backing cylinder may be provided with peripherally-extending rows of apertures for selectively receiving replaceable insert fasteners for the pressure bars. The ratio of the welding cylinder diameter to the backing cylinder is for this purpose preferably a whole number because, if this is so, more variations in weld seam spacings can be produced with the equipment than if the diameter ratio were to be a decimal fraction.

To effect an even greater increase in the pressure of each pressure plate at the moment of contact with the welding cylinder, the operative faces of all the pressure bars may be disposed on a common imaginary enveloping cylinder. Adhesion between the pressure bars and the film material can be prevented by covering the operative face of each pressure bar with an anti-adhesion layer.

Uniform pressure application by the pressure bars over the entire width of the films and the application of constant pressure by the successively operative pressure bars may be ensured by mounting each pressure bar to permit it to yield radially of the backing cylinder. Each pressure bar may be in the form of a welding bar to permit it to introduce additional heat to the films even during the short time that it is in contact with the welding cylinder.

An example of the invention will now be described with reference to the accompanying diagrammatic drawings, in which.

The illustrated welding apparatus serves to provide transverse weld seams or heat seals to two superposed and continuously fed films 1, 2 made of thermally weldable material. The films are fed to a continuously rotating welding cylinder 3 which is rotated at a speed commensurate with the rapidity with which the weld seams are to be produced.

The films 1, 2 are slung about a considerable proportion of the cylinder periphery, namely an arc subtending an angle $\alpha$, and make contact with the surface of the cylinder. During this contact with the cylinder surface, welding is conducted and a certain amount of cooling of the solidifying seams takes place before the films leave the welding cylinder. At its surface, the welding cylinder 3 is provided with a number of transverse welding bars 5 disposed between supporting members 4. The number and pitch of welding bars and interposed supporting members is of course variable but it is preferred that the cylinder surface formed by the members 4 and bars 5 be substantially uninterrupted so as not to impede the smooth feeding of the films by the cylinder.

The superposed films 1, 2 are pulled onto the cylinder under the tension inherent in the films in the film portions that are already slung about the cylinder and are moving in unison therewith. As the films first make tangential contact with the cylinder, any air included between them already tends to be squeezed out.

Figure 1:
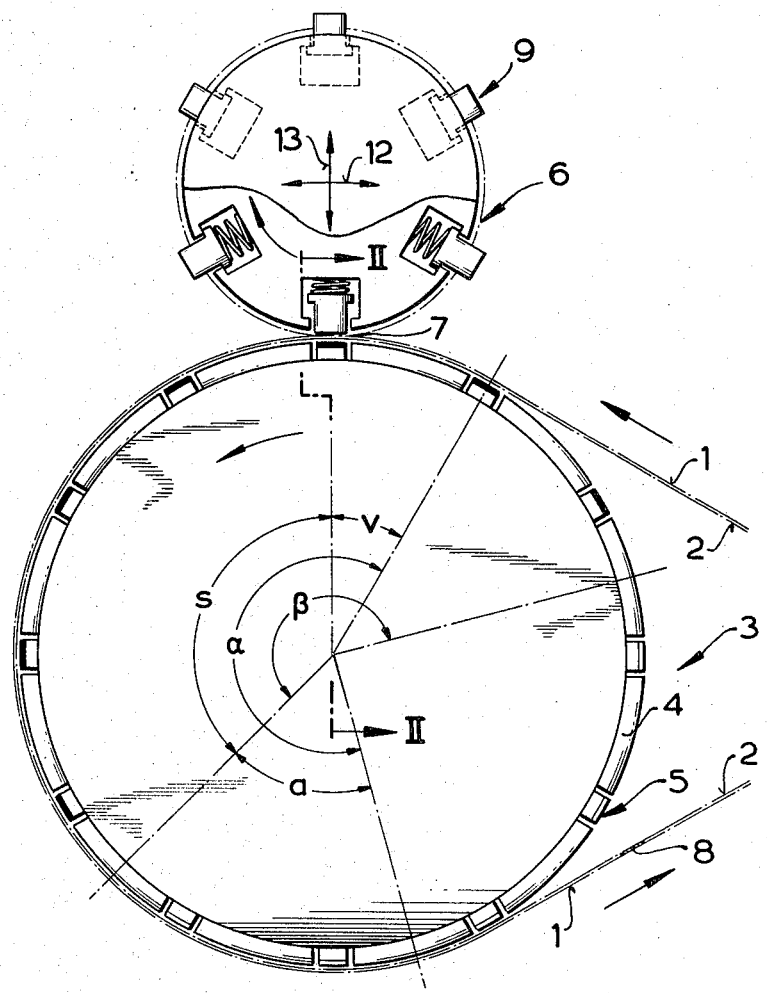
FIG. 1 is a side elevation of a welding apparatus.

On contact with the welding cylinder, the films are subjected to pre-heating by the welding bars 5 which are already switched on. In FIG. 1, heating strips disposed over the welding bars are shown with a solid black cross-section where they are in the energized condition and unhatched where they are switched off. Thus, in the illustrated example each welding bar is switched on while travelling through an arc subtending the angle $\beta$. A region that has already been welded by heat fusion is indicated at 8 in FIG. 1. All such regions to be welded are uniformly pre-heated and heated by the heating strips on the heating bars provided that both of the films are in intimate contact with one another and with a respective heating stip. As a result of the pre-heating, which takes place whilst the films traverse through the angular range $v$, the superposed films have lost their elasticity and are alredy in a plastic or soft condition, the confronting faces of the films thereby beginning to adhere to one another. Substantially complete removal of any air that might still be included between the films in the region to be welded is effected by a backing cylinder 6 which presses on the welding cylinder 3 at the positions of the welding bars 5. The films, which are thereby compressed at the positions to be welded, remain in close contact with one another to preclude the entry of air even after they have left the nip 7 formed between the cylinders 3 and 6. By reason of the close contact between the films and with each welding bar 5, the regions to be welded soon become uniformly heated and, after the heating strips have been switched off, the films are reliably welded to one another at intervals along their lengths and across the entire width of the films. The actual welding period is indicated by the angle $s$.

The illustrated example preferably makes use of impulse-heated pressure bars, that is to say intermittently-heated strips on the pressure bars that are de-energised after the welding period until just before they make contact with the unwelded films approaching the welding cylinder at a tangent. Consequently, the welding period is followed by a cooling phase, the time of which is equivalent to the arcuate path traversed by the welded film through the angle $a$ whilst the films are still in contact with the welding cylinder 3, although the cooling phase may be continued after the films have left the welding cylinder. The films are thereby cooled relatively gently while still supported by the welding cylinder and when the films leave the welding cylinder they can withstand a certain amount of tension for stabilising the movement of the welded films without the danger of stretching the fresh welded regions 8.

The backing cylinder 6 has at its periphery a number of equally spaced pressure bars 9 at a pitch equal to the pitch of the welding bars 5 on the welding cylinder. If the pitch of the welding bars 5 is altered to vary the spacing between adjacent weld seams 8, the pressure bars 9 on the backing cylinder 6 must likewise be adjusted. The largest possible spacing between adjacent weld seams is obtainable when the backing cylinder 6 operates with only a single pressure bar 9. In that case, the welding cylinder of the illustrated example would be provided with two welding bars, the ratio between the diameters of the cylinders 3 and 6 being a whole number, namely 2. The relatively large welding cylinder provides a particularly long welding path to permit adequate heat transmission from the heating strip on each bar 5, even if the films are fairly thick and the temperature of each heating strip is relatively low.

Figure 2:
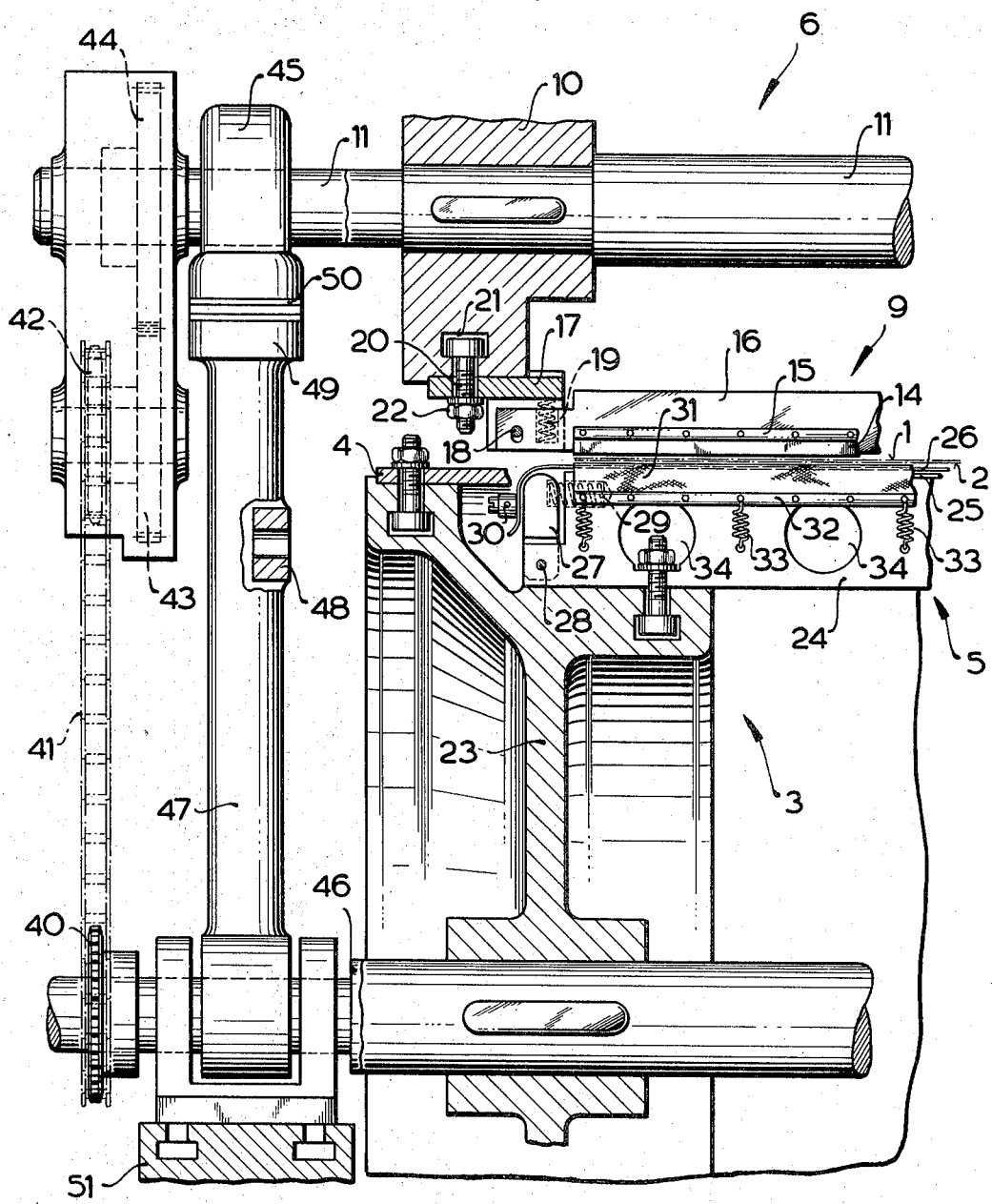
FIG. 2 is a part-sectional fragmentary view taken on the line II—II in FIG. 1.

Referring to FIG. 2, the backing cylinder 6 is equipped with the aforementioned pressure bars 9 which are adjustably mounted by their ends in two flange members 10 (only one is shown). By means of a shaft 1, the two members 10 are interconnected so that they will rotate in unison. The shaft 11 mounted in a frame of the apparatus and is rotated by the welding cylinder 3 with the aid of a suitable positive drive connection, for example the illustrated chain drive comprising a chain 41 and sprockets 40, 42 and gearing 43, 44 ensuring that the two cylinders will rotate in opposite directions. Mounting of the backing cylinder 6 and its drive connection to the welding cylinder 3 is such that a certain amount of adjustment of the backing cylinder relatively to the welding cylinder is possible in the directions of the double arrows 12 and 13 indicated in FIG. 1. A bearing 45 for the rotary shaft 11 of the backing cylinder 6 is carried by a support 47 which is pivotable about a rotary shaft 46 of the welding cylinder. By means of a socket 48 and a lug (not shown), the support 47 can be fixed in position relatively to the shaft 46. Sheet metal laminations 50 are provided between the top 49 of the support 47 and the bearing 45 for the shaft 11. By adding or removing some of these laminations, the backing cylinder 6 is adjustable in the direction of the arrows 13. Pivotal movement of the backing cylinder in the sense of the arrows 12, i.e. pivotal adjustment of the supports 47 holding the rotary shaft 11 of the backing cylinder, is effective to displace the position at which each pressure bar 9 co-operates with a welding bar 5, relatively to the position where the films make first contact with the welding cylinder. Consequently, such displacement of the backing cylinder influences the pre-heating period for the films without the need for altering the electric control of the heating strips on the welding bars or altering the disposition of the films approaching the welding cylinder.

The adjustability of the backing cylinder in the direction of the arrows 13 permits an optimum pressure to be applied to the films on the welding cylinder at a position where a pressure bar 9 meets a welding bar 5. The required pressure is, inter alia, dependent on the thickness of the film material, its thermal properties, and whether and how any air is still trapped between the films when they reach the nip 7. Upon application of pressure by one of the pressure bars 9, any remnant of air between the films underlying the pressure bar is squeezed out towards the sides so that at the area to be welded the pre-heated and plasticized films will be intimately superposed.

The pressure applied to the films at the position of the intended weld seams results in intimate contact between the films and this contact is maintained during continued rotation of the welding cylinder 3. Thus, even after the pressure bar 9 has been raised off the films, the latter remain free from occluded air because the ever reducing elasticity of the films with increasing heating will not permit the previously squeezed-out air to be pressed back into the welded portion of the films.

The operative surface of each welding bar 5 and pressure bar 9 is curved to conform with the periphery of its associated cylinder. This permits a uniform pressure to be applied to each weld seam over its entire width so that the cross-section of each seam will be rectangular. The use of rectilinear operative faces for the bars 5 or 9 would result in a bead-like cross-section for the weld seams because the edges of the bars would exert a greater pressure along the sides of the seam than at the middle of the seam and this could give rise to the entry of air. The exertion of greater pressure at the edges of each weld seam is further minimized by providing each pressure bar with an elastic cover 19 which is attached to a supporting member 16 by means of clamping strips 15. The cover 14 also has the effect of preventing adhesion between each pressure bar and the heated films.

The supporting member or body portion 16 of each pressure bar 9 has its ends radially displaceably mounted in a respective slide bearing 17 from which it is prevented from falling out by means of a pin 18. Compression springs 19 facilitate the application of each pressure bar to the films with uniform pressure. When the films are of constant thickness, it may be advantageous to rely solely on the elasticity of the covering 14 when the pressure bar is to be applied with a particularly large pressure. In that case, the springs 19 would be omitted and the member 16 would be clamped in the bearings 17.

Each slide bearing 17 is secured to the respective flange member 10 by means of a T bolt 20. For this purpose the flange members 10 are provided with T slots 21. Adjustment of a pressure bar 9 is effected after loosening a nut 22 on the bolt 20. In addition, the equipping of the backing cylinder 6 with a new number of pressure bars is facilitated by a row of markings provided on the periphery of the flange member 10 or on the end faces of the pressure bars 9.

Attachment of the welding bars 5, or rather their base members or body portions 23, to the cylinder 3 is effected in a manner similar to that described for the pressure bars on the backing cylinder, i.e. by means of bolts displaceable in T slots. Again, markings may be provided on the main body 23 of the cylinder 3 or on the end faces of the supporting members 4 or bars 5 to facilitate adjustment.

The construction of the welding cylinder 3 is likewise analogous to that of the backing cylinder. Thus, there is also a pair of flange members 23 which are interconnected for rotation in unison by means of the aforementioned rotary shaft or drive shaft 46. As in the case of the rotary shaft 11, the shaft 46 is extended laterally and mounted for rotation in portions 51 of the machine frame. The aforementioned sprocket 40 of the chain transmission is carried by the shaft 46.

In the illustrated example, the welding bars 5 comprise the body portion 24 which contains apertures 34. These apertures permit access to the aforementioned T bolts and also improve the cooling property of the welding bar. The operative face of each welding bar formed by the radially outwardly directed face of the body portion 24 is provided with a strip 25 of silicon rubber foam providing a resilient pad for a heating strip 26 superposed thereon.

The strip 26 is stretched between two insulating members 27 at the ends of the welding bar. These insulating members 27 are pivoted at 28 and are subjected to the pressures of compression springs 29 to keep the strip 26 taut even when the strip 26 undergoes thermal elongation. Each insulating member 27 also carries an electric terminal 30 for connection to a collector or slip ring by which the heating strip 26 is electrically energised.

With a view to facilitating assembly and mounting of the welding bars, the electrical connection to the heating strip 26 should be such that even a layman can carry it out without difficulty. In the vicinity of the body member 24 of each welding bar, the heating strip 26 is covered by a sheet 31 of polytetrafluoroethylene. The edges of the sheet are held in clamping rails 32 and springs 33 keep the sheet taut at all times to avoid unintentional displacement of the heating strip 26 whilst pressure is applied by the bars 9 of the backing cylinder.

In special cases it may be advantageous to supplement the pre-heating effect of the welding bars 5 by also providing the pressure bars 9 with a heating strip in a manner analogous with that described for the welding bars, thereby eliminating any disadvantage of introducing the heat only through the film 2 adjacent the welding bars. Heated pressure bars might be necessary if the films are unduly thick. Thick films must in any case be welded at a relatively slow speed and thus the relatively longer time during which pressure is applied will be sufficient for heat to be effectively transmitted to the films from a heated pressure bar.

I claim:

1. Apparatus for fusing a plurality of superposed continuously fed plastics films or the like to one another by means of transverse weld seams, comprising a rotary welding cylinder about which the films are partially slung, a plurality of welding bars carried by the welding cylinder at its periphery, a backing cylinder mounted on a rotary shaft for exerting pressure on the superposed films, a plurality of pressure bars provided on the backing cylinder at a pitch corresponding to that of the welding bars, and means for rotating the backing cylinder at the same peripheral speed as the welding cylinder, the rotary shaft of the backing cylinder being adjustable in position along an arc concentric with the welding cylinder.

2. Apparatus according to claim 1, wherein the backing cylinder is provided with T slots for receiving replaceable clamping means for the pressure bars.

3. Apparatus according to claim 1, wherein the backing cylinder is provided with peripherally extending rows of apertures for selectively receiving replaceable insert fasteners for the pressure bars.

4. Apparatus according to claim 1, wherein the ratio of the welding cylinder diameter to the backing cylinder diameter is a whole number.

5. Apparatus according to claim 1, wherein the operative faces of all the pressure bars are disposed on a common imaginary enveloping cylinder.

6. Apparatus according to claim 1, wherein the operative face of each pressure bar is covered with an anti-adhesion layer.

7. Apparatus according to claim 1, wherein each pressure bar is mounted to permit it to yield radially of the backing cylinder.

8. Apparatus according to claim 1, wherein each pressure bar is in the form of a welding bar.

* * * * *